Figure 1:
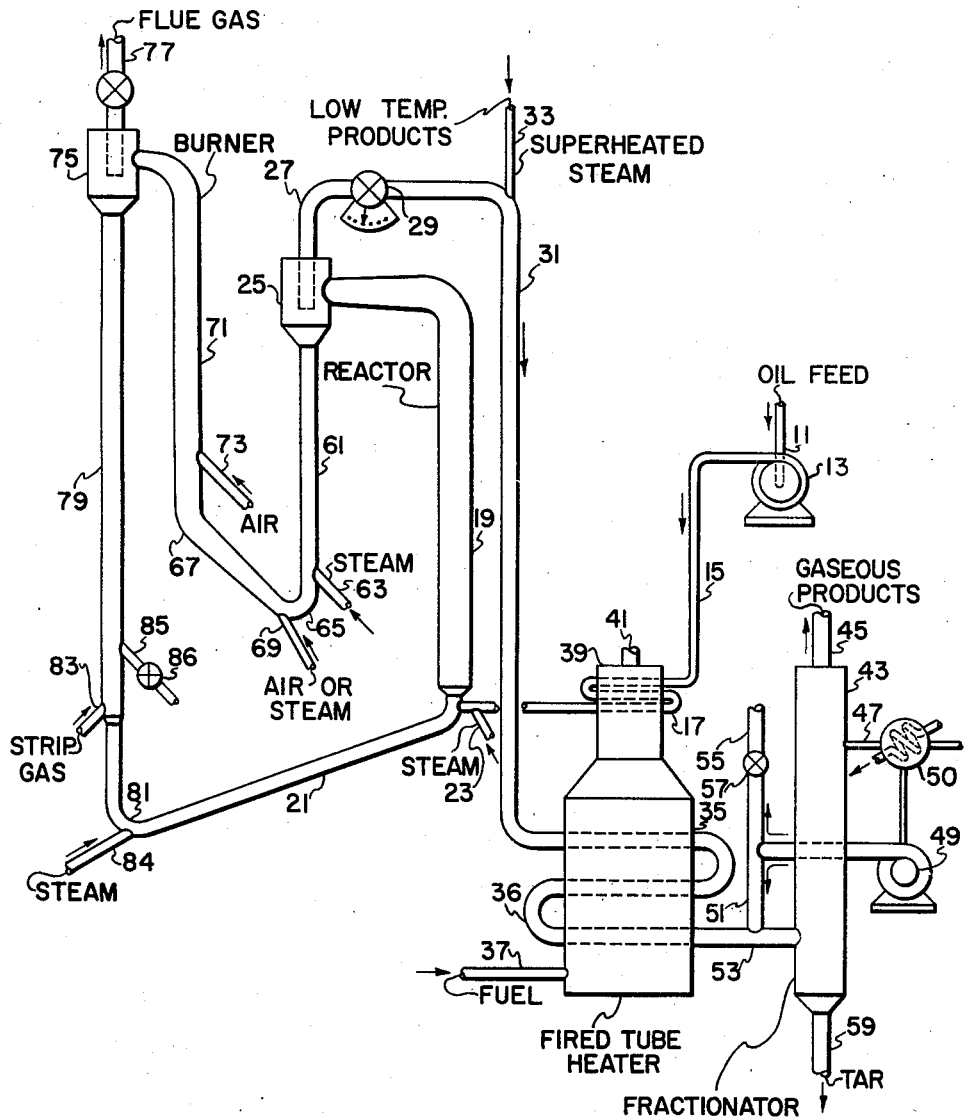

FIG. I

Edward D. Boston
Brook I. Smith   Inventors

By *Small, Dunham & Thomas* Attorneys

Edward D. Boston
Brook I. Smith    Inventors

United States Patent Office 2,905,733
Patented Sept. 22, 1959

2,905,733

COMBINATION PROCESS FOR PRODUCING OLEFINS FROM HEAVY OILS

Edward D. Boston, Westfield, and Brook I. Smith, Elizabeth, N.J., assignors to Esso Research and Engineering Company, a corporation of Delaware Application December 24, 1954, Serial No. 477,545

5 Claims. (Cl. 260—683)

The present invention relates to a combination process for producing olefins, diolefins and aromatic hydrocarbons from heavy hydrocarbon oils. The invention has particular application to the conversion of heavy oils such as petroleum residua to very low molecular weight unsaturates such as ethylene, propylene, butadiene, butylene and $C_5$ diolefins and to benzene and other low boiling aromatic hydrocarbons.

In the prior art it has been the practice for a number of years to produce ethylene, propylene, butadiene, etc., by steam cracking relatively clean and coke-free distillates such as virgin naphtha or virgin gas oil at high temperatures, for example, above about 1200° F. The process has not been successfully applied hitherto to the conversion of heavy residual type oils because of the excessive quantities of coke and other carbonaceous deposits which are formed and which tend rapidly to clog the apparatus.

On the other hand, it has been proposed in the prior art to convert heavy residua to low molecular weight products and carbonaceous residue by coking the oil, at least partly in liquid phase, with a preheated particulate solids in a fluidized mass or stream. In the latter process the carbonaceous products of decomposition are largely deposited upon the heat carrying solids. The latter preferably are particles of coke produced in the process although other particles which are relatively inert catalytically and which have suitable heat carrying properties can be used.

The present invention is based upon the discovery that heavy hydrocarbon oils, e.g. those boiling above about 1000° F., and the like which are too high in Conradson carbon, or coke-forming propensities for conversion in tubular type furnaces, can nevertheless be converted to the desired olefins, diolefins, etc., by a combination process.

Figure 2:
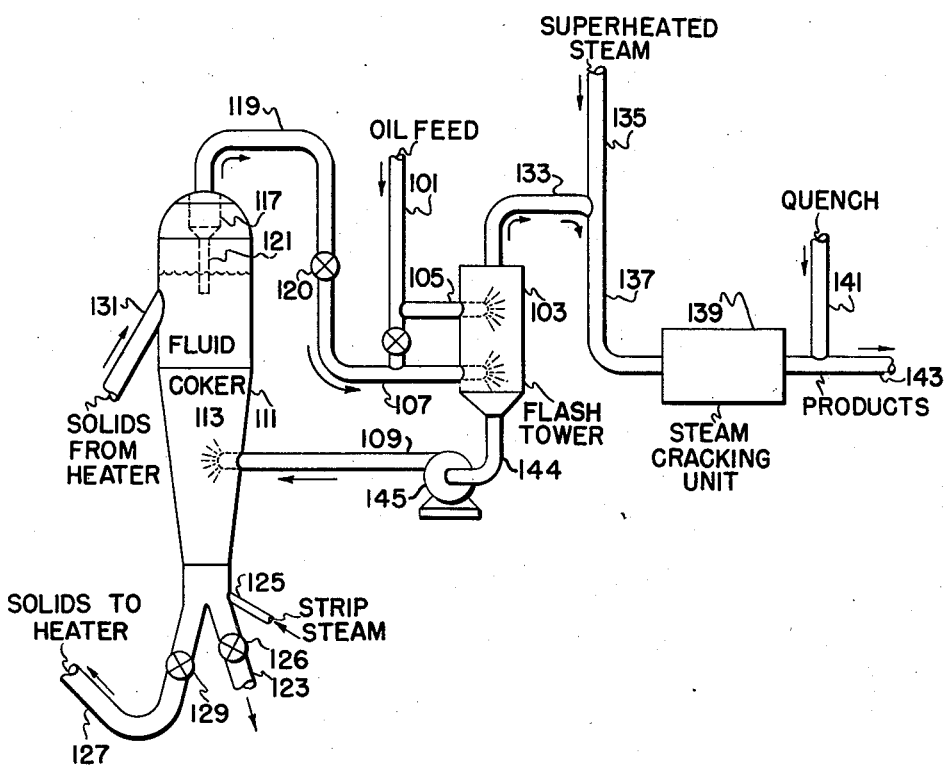

In the conversion of oils, such as gas oil or naphtha to low molecular weight olefins, diolefins, etc., it is highly advantageous to have a rising temperature gradient as the material being converted passes through the apparatus. This is due to the fact that increasing the temperature promotes the cracking and dehydrogenation reactions to form the desired olefinic material. Any reduction in temperature, other than a rapid quenching of several hundred ° F., promotes the polymerization reactions, and tars are formed from the unsaturated material previously formed at higher temperatures. The solids contacting process such as the fluid bed or transfer line suspension systems usually have a relatively constant or slightly decreasing temperature gradient which is quite unsatisfactory for the production of ethylene, butadiene and like materials. By first cracking the heavy oils by contacting them with heat-carrying solids to remove substantially all of the coke-forming material, the resulting products in vapor phase may then be cracked further by passing them through a tubular furnace. For this purpose, superheated steam is preferably used as the carrying and cracking medium, with excellent results. Such is the major object of the present invention. The invention will be more clearly understood by reference to the accompanying drawings wherein:

Fig. 1 shows a suitable method and apparatus for first cracking heavy oils, e.g. in a transfer line thermal cracking unit, by contacting the oil with heat-carrying particulate solids, and then cracking the separated vapors in a high temperature tubular system of the steam coil type;

Fig. 2 shows a modification wherein the heavy oil is first cracked or coked in a fluid bed particulate solids system and the vapor products are passed to the tubular or steam cracking unit for further cracking. In this figure, the hot vapors from the coker are also used to help heat and to partially vaporize the feed. The cool feed is employed to condense the heavy portions of the hot vapors, substantially eliminating coke-forming material in the feed to the coil.

Referring first to Fig. 1, a heavy oil feed stock such as a petroleum residuum is fed through an inlet line 11 to a pump 13 which supplies suitable pressure to pass it through line 15, through a preheating coil 17, and into a transfer line reactor or contacting zone 19. The latter may be operated at near atmospheric pressure but is preferably at moderate pressure, e.g. 10 to 70 p.s.i.g. A stream of preheated solid particles, which may be at a suitable temperature between about 750 and 1600° F., preferably 1100° to 1300° F., is supplied through a solids inlet line 21. Steam may be introduced through line 23 to assist in vaporizing or admixing the feed with the solids and also to help carry the stream of solids upwardly through the transfer line reactor 19. It will be understood that the heat requirements for thermal cracking in this reaction zone 19 are supplied predominantly by the stream of preheated solid particles fed thereto and not by the steam to any large extent.

The steam velocity, which largely determines contact time, and the temperature employed within reactor 19, are such as to accomplish substantially total conversion of the feed to vapors and carbonaceous residue. The latter is deposited upon the hot particles which are supplied from line 21. It may be in the form of dry coke although ordinarily it will contain some hydrocarbons or carbonaceous materials which are not completely converted to coke. The preferred reaction temperature in this first zone is between about 700° and 1100° F.

The upflowing stream of vapors and solids bearing carbonaceous deposits is passed into a cyclone separator 25. Here the vapors are separated and taken overhead through outlet line 27. An adjustable pressure reducing valve 29 is preferably employed to control the outlet pressure of the vapor products. These products then pass through line 31 where they are contacted with superheated steam supplied by line 33. The stream of vapors and superheated steam is passed through the fired tubular heater 35 which contains suitable coils 36 to supply ample heat to the stream to maintain an increasing temperature gradient. Here the reaction (steam-cracking) temperature is at least 1200° F. and may be as high as 1600° F. A temperature between 1250° and 1400° F. is usually preferred. Fuel may be supplied to the heater or furnace 35 through line 37. The combustion gases passing overhead through section 39 are used to preheat the feed in the tube 17 as mentioned above. These gases may be removed through outlet 41 and passed through other suitable heat recovery apparatus as will be obvious. The cracking at the coil outlet should be sufficiently severe to convert about 25 wt. percent or more of the vapors to $C_3$ and lighter gases. Conversion below 20% is not effective for olefin production; conversion above 40% is highly destructive, with high coke production.

Upon completion of the second stage thermal cracking to produce ethylene, propylene, butadiene, etc., it is desirable to quench these materials quickly to prevent polymerization and other degradation of the products. In the system of Figure 1 the products are instantaneously cooled at least 200° F. by a cooled cycle oil fraction entering from line 51. The quenched products are then passed into a fractionator 43. From this fractionator the normally gaseous and distillate products may be taken overhead through outlet 45. An intermediate fraction such as cycle oil is taken off at line 47, cooled in exchanger 50 and recycled by pump 49 to line 51 for quenching. Excess quantities of this intermediate fraction or cycle oil may be taken out, if desired, through a suitable outlet line such as 55 under control of a valve 57. Tar or other heavy bottoms may be withdrawn from the lower part of the fractionator through line 59. Obviously the latter may be recycled to reactor 19 for total conversion if desired.

The solids separated by cyclone 25 are taken downwardly through line 61 where they may be stripped with steam admitted through line 63. They pass through a reverse bend 65 of appropriate design and upwardly into a riser 67. Aerating gas, such as air or steam, may be introduced through line 69 for assisting in propelling them upwardly and/or for initiating combustion and reheating.

The riser 67 joins a burner which may be of the transfer line type as shown at 71. Air for combustion is supplied through one or more inlet lines 73. These may be spaced at intervals along the burner if needed for good control of combustion. In this burner the solids are preheated to the desired temperature, 750° to 1600° F., or higher if desired, by combustion of part of the carbonaceous material. Usually preheating to 1100° to 1300° F. is preferred, as noted above. In some cases, all of the carbonaceous material may be burned and/or extraneous fuel may be added along with the air. However, in most cases the quantity of carbonaceous deposits produced is more than adequate to supply heat requirements. Hence, coke produced in the process may be available as a by-product.

The reheated solids are separated from the propelling and combustion gases by a separator such as cyclone 75. The gases pass overhead through outlet 77, with suitable pressure reduction when and if required. The solids pass downwardly through line 79 to a return bend 81 and a riser 21. Stripping steam or other gas may be introduced through line 83 if desired and lift gas or steam may be introduced by one or more inlets 84. Where the production of coke is greater than needed for heat requirements, the surplus may be removed through drawoff line 85 equipped with a suitable outlet and/or depressuring valve system 86. Ordinarily, it is preferred to use coke made in the process as the heat-carrying solid material used in the reactor as is now well known in the art.

Referring now to Fig. 2, the general system is somewhat similar to that of Fig. 1, but the first stage reaction is carried out in a fluidized bed of hot particulate solids. Oil is fed through a line 101 at suitable pressure into a flash tower 103 through alternative lines 105, 107. The feed may be divided between these two lines if desired, but it is preferred to use line 107 to obtain improved contact with the coker vapors.

In the flash drum or tower 103 vapors are separated from liquid and the latter is passed through line 144, pump 145 and line 109 to fluid bed coker 111. The latter may be of conventional type, such as shown for example, in the application of Pfeiffer et al., Ser. No. 375,008 filed August 19, 1953. The feed is sprayed through one or more nozzles 113 into the fluidized mass of particulate preheated solids which form the coking bed.

The vapor products from the coking operation are separated in a suitable separator or cyclone 117 and passed overhead through line 119 which joins the inlet 107 to the flash tower. A valve 120 is provided for pressure reduction when desired. The separated solids from 117 are returned to the bed through a line or dip leg 121. Surplus coke produced in the process may be withdrawn from the system through outlet line 123 after stripping with steam admitted through line 125. Outlet valve means 126 are provided for pressure control, when needed. The spent solids not withdrawn are passed through a line 127 under control of a valve means 129 to a conventional solids heater which may be either of the transfer line or the fluid bed type, not shown. After reheating, the solids are returned to the system through line 131, appropriate seed particles for nuclei in the coking process being added or produced in any suitable manner.

The vapors leaving the coker through line 119 are mixed with and serve to partially vaporize the feed introduced with them through nozzle or inlet 107. From here, the vapors pass upwardly from the flash tower through line 133 while the liquid passes downwardly through line 144, pump 145 and line 109 as previously mentioned. The vapors are mixed with superheated steam supplied by line 135, the combined stream being passed through line 137 into a conventional steam cracking unit which may be of any suitable type, for example like that shown at 35 in Figure 1. In Figure 2, it is indicated conventionally by reference character 139. Upon leaving the steam cracking unit, the products are immediately quenched by addition thereto of a suitable liquid such as water or oil or, if desired, by introduction of a stream of cool solid particles. Any or all of these may be introduced by line 141, or by a plurality of such lines, into the outlet line 143. From the latter, the products are taken to suitable recovery apparatus not shown. Appropriate pressure releasing valves are provided (not shown) as needed, as will be clear to those skilled in the art.

In the first or coking step it is desirable to minimize the conversion of the feed to dry gas. Preferably, this conversion should not be greater than 5% or at most 7% by weight of $C_3$ and lighter gases, based on the coke-free oil feed, where the coke-free oil is the total oil feed minus the coke product. Heavy portions of the residuum which contain condensed ring aromatics and the like, and which would crack to undesirable products such as hydrogen and methane if allowed to remain in the reactor for a longer period of time, may remain upon the solid particles which are separated in the cyclones 25 or 117. The solids, after stripping, are passed to a conventional transfer line or fluid bed burner for reheating where, of course, the unconverted hydrocarbons are usually preferentially burned off the coke.

The addition of superheated steam in the second stage is advantageous for the production of the usually desired unsaturates at the expense of saturated hydrocarbons. This results in a lower hydrocarbon partial pressure which both increases the yields of the more valuable unsaturates, such as ethylene and butadiene, and also helps prevent coke formation due to condensation of high boiling materials in the transfer lines and in the coil furnace. Hence, the total steam used for the high temperature cracking should be at least 10% by weight based on the vapors in the steam cracking lines.

The final cracked products leaving the steam cracking furnace should be at a temperature of 1200–1600° F., the range of 1300–1400° F. being preferred. Preferably, these are immediately quenched to about 600° F. A quench of at least 200° F. within 0.1 second or less is necessary and it is preferably quicker and more drastic. As noted above, various quenching media may be used but it is preferable to use a cool recycled oil for this purpose as shown in Figure 1. A suitable heat exchanger may be employed as indicated at 50, for cooling the quench oil. Similar means, not shown, may be used in Fig. 2.

In the system of Fig. 2, the first stage or coker overhead vapors themselves are partially quenched by contact with the oil feed and/or by liquid-vapor contact in flash tower 103. Preferably, this operation should be so controlled as to condense the 1000° F. and heavier material. The condensation point may be as low as 900° or as high as 1050° F. The condensed material of course is recycled to the coker, greatly reducing the Conradson carbon content of the vapors which pass to the steam cracking unit. This removal of the coke-forming material from the steam cracking feed is an important aspect of this invention.

By suitable adjustment of control valves and nozzles, etc., the two cracking zones can be operated at different hydrocarbon partial pressures. The advantages of such operation are more clearly pointed out in a copending application of Brook I. Smith et al. Serial No. 438,999, filed June 24, 1954. The use of high pressure in the first or low temperature zone and a lower pressure in the second or high temperature zone will give at least normal yields of the lower olefins and diolefins and substantially greater yields of aromatics than conventional steam cracking operations.

This invention has economic advantages particularly where refineries are already equipped with steam cracking furnaces. By combining a relatively small fluid coker with such a furnace, the following advantages are obtained over such alternatives as high temperature fluidized solids coking of residua to produce ethylene, butadiene, etc.

(1) The coil-type of heating curve (increasing temperature) will given increased yields of $C_4$, $C_5$ and distillate products.

(2) The coker can be smaller than a unit required for the total conversion since less heat is required and, consequently, less coke is burned and circulated.

(3) Undesirable hydrogen and methane can be held to a minimum in the product gases by removing heavy condensed-ring aromatics, depositing them on the coke particles going to the burner.

(4) Cheaper construction of the coking apparatus can be used due to the lower temperature permissible.

(5) Fuel gas is burned in place of coke which, when of high grade, has a high value as an electrode raw material. If fuel gas is burned in the alternate apparatus, a high temperature coker, the carbon dioxide in the combustion gases reacts with the coke to form carbon monoxide, which reaction requires additional heat and results in loss of coke.

What is claimed is:

1. The process of converting heavy high Conradson carbon hydrocarbon oil boiling predominantly above about 1000° F. to low molecular weight unsaturated hydrocarbons plus carbonaceous material, which comprises subdividing the oil at least partially in liquid phase and contacting it while so subdivided with preheated solid particles in the form of a fluidized mobile mass at a temperature within the limits of about 700° to 1100° F. for a period of time sufficient to convert a major portion of the oil feed to vapor products and carbonaceous residue deposited on said solids, but under conditions which produce not more than about 7% by weight of $C_3$ and lighter gases on coke-free oil feed, separating said vapor products from said solids, separating a heavy ends fraction boiling above about 900° F. from said vapor products, passing the remainder of said vapor products including substantially all vaporous coker products boiling below about 900° F. and steam through a high temperature cracking oil maintained at a temperature within the range of about 1200° to 1600° F. for a period of time sufficient to further crack said vapors to lighter hydrocarbons including at least 25% by weight thereof and not more than about 40% by weight to $C_3$ and lighter products and quenching said lighter hydrocarbons within a time period not greater than said cracking period by cooling at least 200° F.

2. Process according to claim 1 wherein the solids are reheated in part at least by combustion of extraneous fuel to increase coke production.

3. The process for converting heavy high Conradson carbon hydrocarbon oil to low molecular weight unsaturates including ethylene and butadiene with low production of ligher gases, which comprises first thermally cracking said oil by contacting it in finely divided form with a mass of fluidized preheated solid particles at a temperature within the range of about 700° to 1100° F. to produce vapors and to deposit carbonaceous material on said particles, separating the vapors from said particles and said deposits, separating a heavy ends fraction boiling above about 900° F. from said vapors, passing the remainder of said vapors including substantially all vaporous coker products boiling below 900° F. through a high temperature cracking coil at a temperature above about 1200° F. in contact with superheated steam for a period of time sufficient to produce the desired low molecular weight unsaturates, and promptly quenching said unsaturates to a temperature at least 200° F. below said high cracking temperature.

4. Process according to claim 3 wherein the high temperature cracking with superheated steam is accomplished with an increasing temperature gradient.

5. A method for converting high Conradson carbon heavy oil feeds to chemicals products which comprises initially thermal cracking said heavy oil by contacting it with a fluidized bed of inert solid particles maintained at a temperature of about 700° to 1100° F. in a coking zone to form vaporous product effluent and to deposit carbonaceous matter on said bed particles, separating a heavy ends fraction boiling above about 900° F. from said effluent and recycling said fraction to said bed of solids, passing the remainder of said coking zone vaporous effluent including substantially all vapors boiling below 900° F. admixed with superheated steam through a high temperature cracking coil maintained at a temperature above about 1200° F., for a time sufficient to produce chemicals products, and thereafter quenching the products leaving said cracking coil.

References Cited in the file of this patent

UNITED STATES PATENTS

| 2,185,566 | Porter et al. | Jan. 2, 1940 |
| 2,245,819 | Porter | June 17, 1941 |
| 2,362,270 | Hemminger | Nov. 7, 1944 |
| 2,731,508 | Jahnig et al. | Jan. 17, 1956 |
| 2,763,601 | Martin et al. | Sept. 18, 1956 |

FOREIGN PATENTS

| 1,062,587 | France | Dec. 9, 1953 |

OTHER REFERENCES

King. et al.: "Petroleum Processing," vol. 7, pp. 1644–7 (1952).

Voorhies et al.: "The Petroleum Engineer," Reference Annual, July 15, 1954, pages C–3 to C–9.